US008510079B2

(12) United States Patent
Chiou et al.

(10) Patent No.: US 8,510,079 B2
(45) Date of Patent: Aug. 13, 2013

(54) SYSTEMS AND METHODS FOR AN ADVANCED PEDOMETER

(75) Inventors: Kuo-Liang Chiou, Canoga park, CA (US); Scot L. Osburn, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 314 days.

(21) Appl. No.: 12/771,536

(22) Filed: Apr. 30, 2010

(65) Prior Publication Data

US 2011/0270573 A1    Nov. 3, 2011

(51) Int. Cl.
G01C 5/00 (2006.01)
G01C 3/00 (2006.01)
G01C 9/20 (2006.01)
G01C 9/22 (2006.01)

(52) U.S. Cl.
USPC ............ 702/160; 702/150; 702/182; 702/187

(58) Field of Classification Search
USPC ................ 702/127, 141, 142, 150, 160, 182, 702/187, 188; 345/156; 396/55; 700/253; 701/472
See application file for complete search history.

(56) References Cited

U.S. PATENT DOCUMENTS

| | | | |
|---|---|---|---|
| 6,813,582 B2 | 11/2004 | Levi et al. | |
| 6,826,477 B2 * | 11/2004 | Ladetto et al. | 701/472 |
| 7,305,303 B2 * | 12/2007 | Soehren et al. | 701/472 |
| 7,610,166 B1 * | 10/2009 | Solinsky | 702/160 |
| 8,150,624 B2 * | 4/2012 | Berardi et al. | 701/500 |

OTHER PUBLICATIONS

J. Parviainen et al. "Differential Barometry in Personal Navigation." IEEE, 2008, p. 148-152.
Bernhard Krach et al. "Cascaded Estimation Architecture for Integration of Foot-Mounted Inertial Sensors." IEEE, 2008, p. 112-119.
S.P. Kwakkel et al. "GNSS Aided In Situ Human Lower Limb Kinematics During Running." ION GNSSO8—Savannah, GA. Sep. 16-19, 2008, 10 pages.
Tom Judd et al. "Use of a New Pedometric Reckoning Module in GPS Denied Environments." IEEE, 2008, p. 120-128.

(Continued)

*Primary Examiner* — Marc Armand
*Assistant Examiner* — Felix Suarez
(74) *Attorney, Agent, or Firm* — Sutherland Asbill & Brennan LLP

(57) ABSTRACT

Systems and methods are provided for an advanced pedometer, which may include: a first accelerometer for providing first acceleration information for a first direction; a second accelerometer for providing second acceleration information for a second direction; a third accelerometer for providing third acceleration for a third direction; a clock for providing time information associated with the first acceleration information, the second acceleration information, and the third acceleration information; and a processing module comprising one or more processors. The processing module may be to execute computer-executable instructions to: determine fourth level acceleration information for a plane using the first acceleration information for the first direction, and the second acceleration information for the second direction, where the plane is defined by the first direction and the second direction; and estimate a distance traveled using the fourth level acceleration information, the third acceleration information, and at least a portion of the time information.

18 Claims, 4 Drawing Sheets

(56) References Cited

OTHER PUBLICATIONS

Saurabh Godha. "Performance Evaluation of Low Cost MEMS-Based IMU Integrated with GPS for Land Vehicle Navigation Application." University of Calgary, Department of Geomatics Engineering, UCGE Reports No. 20239. Feb. 2006, 230 pages <http://www.geomatics.ucalgary.ca/research/publications/GradTheses.html>.

Sidney P. Kwakkel. "Foot and Ankle Kinematics During Gait Using Foot Mounted Inertial Sensors." University of Calgary, Department of Geomatics Engineering. Apr. 2007, 60 pages.

Hui-Ming Chai. "The Gait During Ambulation." Kinesiology, NTUPT, 2004, 17 pages <http://www.pt.ntu.edu.tw/hmchai/Kines04/KINapplication/Gait.htm>.

\* cited by examiner

SYSTEMS AND METHODS FOR AN ADVANCED PEDOMETER

FIELD OF THE INVENTION

Aspects of the invention relate generally to advanced pedometers.

BACKGROUND OF THE INVENTION

Some prior pedometers estimate the distance traveled by counting the number of steps and multiplying by an average person's stride length. However, non-standard stride lengths and a variety of other factors are sources of error in the estimated distance traveled. Other pedometers use accelerometers and a barometer to estimate the distance of each step. However, these other pedometers do not provide calibration for accelerometer drift, and thus, the accuracy of the measured steps varies greatly over time.

More recent pedometers include an inertial navigation system (INS) with a global positioning system (GPS) to improve distance estimates with each step. The inertial navigation system generally includes gyro technology, which can include MEMs or non-MEMs gyros. It will be appreciated that current MEMs gyro technology is not sufficiently accurate for navigation devices. Likewise, non-MEMS gyro technology takes up a large amount of space, consumes a large amount of power, and can be heavy. GPS improves a pedometer's accuracy, but because GPS signals are weak, the GPS does not work in a variety of environmental conditions such as with heavy foliage, buildings, etc. In addition, pedometers with INS and GPS tend to consume a significant amount of power and require frequent battery replacements.

Magnetometers or compass sensors have been utilized in pedometers to improve performance in a GPS-denied environment. However, due to anomalous readings caused by nearby metals, magnetometers and compass sensors have degraded accuracy in some environments. Although the added magnetometer or compass sensor can improve pedometer performance in some environments, there remain the problems of additional hardware, increased complexity, increased cost, and increased power consumption.

SUMMARY OF THE INVENTION

Some or all of the above needs and/or problems may be addressed by certain embodiments of the invention. According to an embodiment of the invention, there is disclosed an advanced pedometer. The pedometer can include a first accelerometer for providing first acceleration information for a first direction; a second accelerometer for providing second acceleration information for a second direction; a third accelerometer for providing third acceleration for a third direction, wherein the first, second, and third directions are independent of each other; a clock for providing time information associated with the first acceleration information, the second acceleration information, and the third acceleration information; and a processing module comprising one or more processors. The processing module is configured to receive the first, second, and third acceleration information, and is further configured to execute computer-executable instructions to: determine fourth level acceleration information for a plane using the first acceleration information for the first direction, and the second acceleration information for the second direction, wherein the plane is defined by the first direction and the second direction; and estimate a distance traveled using the fourth level acceleration information, the third acceleration information, and at least a portion of the time information.

According to another embodiment of the invention, there is disclosed a method for an advanced pedometer. The method may include receiving, from a first accelerometer, first acceleration information for a first direction; receiving, from a second accelerometer, second acceleration information for a second direction; receiving, from a third accelerometer, third acceleration for a third direction, wherein the first, second, and third directions are independent of each other; receiving, from a clock, time information associated with the first acceleration information, the second acceleration information, and the third acceleration information; determining fourth level acceleration information for a plane using the first acceleration information for the first direction, and the second acceleration information for the second direction, wherein the plane is defined by the first direction and the second direction; and estimating a distance traveled using the fourth level acceleration information, the third acceleration information, and a time associated with the fourth level acceleration information and the third acceleration information. One or more of the above operations can be performed by one or more processors associated with a processing module.

BRIEF DESCRIPTION OF THE DRAWINGS

Reference will now be made to the accompanying drawings, which are not necessarily drawn to scale, and wherein.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention can provide systems and methods for an advanced pedometer. The advanced pedometer may be operative to measure distance traveled and an associated speed. The pedometer can include a plurality of accelerometers for determining, either directly or indirectly, acceleration in a floor/level plane or in a vertical direction.

Example embodiments of the pedometer can be positioned anywhere on a body (e.g., foot, hip, thigh, etc.) where zero-level speed (in a floor/level plane) or zero-vertical speed can be detected. These zero-level speed updates or zero-vertical speed updates can be used by a Kalman filter (e.g., an extended Kalman filter (EKF)) to determine calibration or error-compensation information for the accelerometers.

It will be appreciated that example embodiments of the pedometer can measure distance and speed without reference to a particular direction. In other words, the example pedometer can provide distance and speed information without the need to maintain the associated direction information for later presentation or display. Thus, example embodiments of the pedometer do not require directional sensors in the form of gyro and magnetic sensors to determine directions, thereby resulting in a cost-, weight-, and power-efficient pedometer.

System Overview

Figure 1:
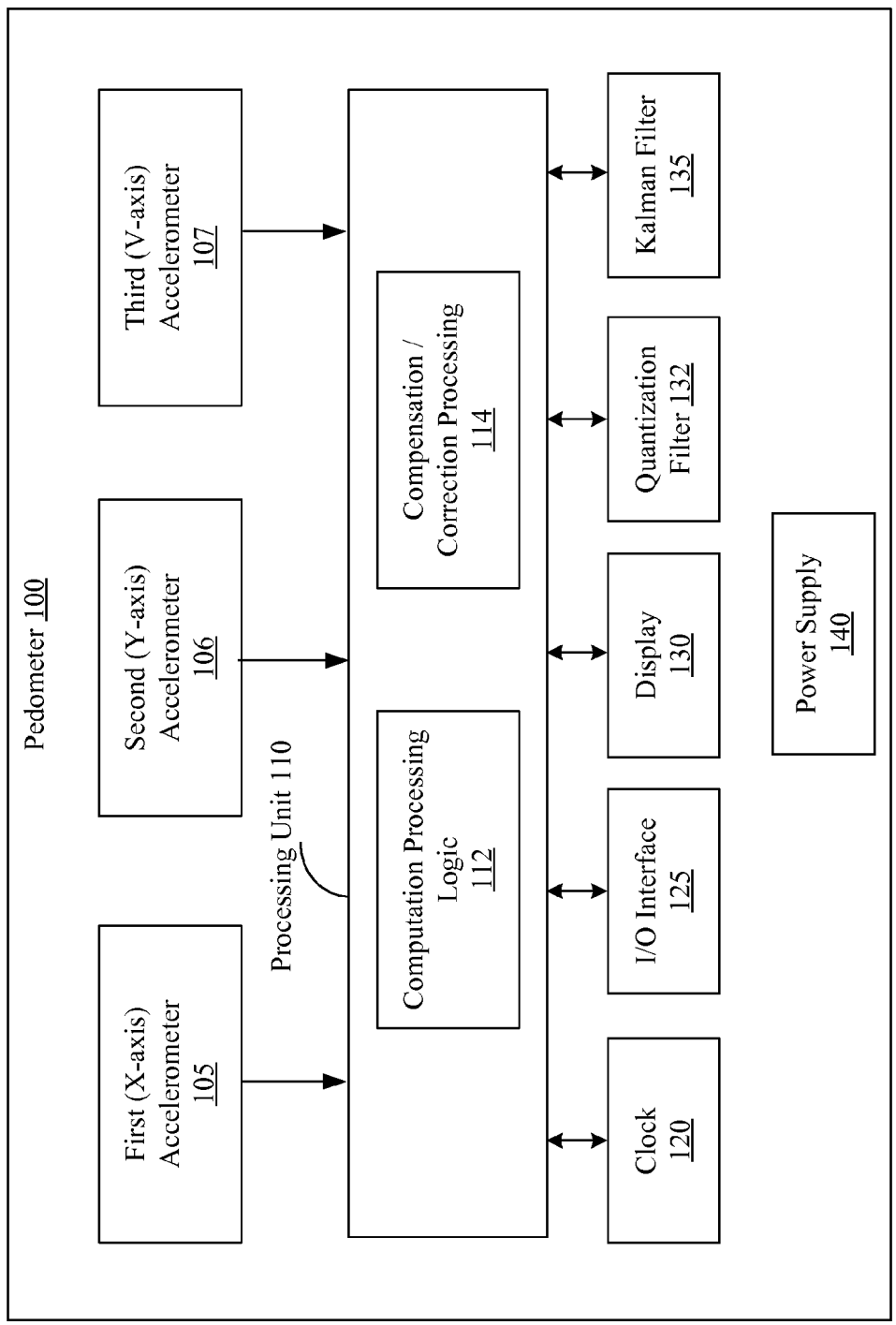
FIG. 1 illustrates an example block diagram of a pedometer in accordance with an example embodiment of the invention.

FIG. 1 illustrates an example block diagram of an example pedometer 100 in accordance with an example embodiment of the invention. As shown in FIG. 1, the example pedometer can include a first accelerometer 105, a second accelerometer 106, and a third accelerometer 107, which each can measure respective non-mass attraction acceleration. Each accelerometer 105, 106, 107 can provide respective acceleration information for a particular direction. For example, the first accelerometer 105 can provide acceleration information for an X axis or direction, and the second accelerometer 106 can provide acceleration information for a Y axis or direction. It will be appreciated that the X axis or direction in conjunction with a Y axis or direction can define a plane, for example, a level plane, and their particular orientation is arbitrary, and can be with respect to the forward and left directions, but this is not necessary. The third accelerometer 107 can provide acceleration information for a vertical (V) axis or direction. It will be appreciated that the V axis or direction can be perpendicular to the X axis or direction, the Y axis or direction, and/or the plane defined by both the X axis or direction and the Y axis or direction. While the X, Y, and V axes or directions have been described as being independent of each other, there may be some overlap in the X, Y, and/or V axes or directions without departing from example embodiments of the invention.

The respective acceleration information from the accelerometers 105, 106, 107 may be received by the processing unit 110 for computation of speed and/or distance by the computation processing logic module 112, as well as for the determination of any needed error compensation by the compensation/correction processing module 114. As described herein, the compensation/correction processing module 114 may include or access a Kalman filter 135 such as an extended Kalman filter (EKF) to assist in determining one or more error states or compensation data (e.g., acceleration error compensation, distance and/or speed compensation, etc.). While a Kalman filter 135 has been utilized for error correction, it will be appreciated that other types of correction filters can likewise be utilized without departing from example embodiments of the invention.

It will be appreciated that the acceleration information can be provided from the accelerometers 105, 106, 107 in an analog or digital format. If the acceleration information is in analog format, then the processing unit 110 may include or utilize one or more digital-to-analog converters to digitize the acceleration information. In addition, the processing unit 110 may include or access one or more quantization filters 132 to reduce quantization noise, according to an example embodiment of the invention.

The processing unit 110 can also include or otherwise access other modules, including a clock 120, input/output (I/O) interface 125, and a display 130. The clock 120 may provide timing information for use in determining the speed and/or distance by the processing unit 110. In addition, the clock 120 may provide real-time timing information for presentation on the visual display 130, which may be an LCD screen, an LED screen, etc. The I/O interface 125 can coordinate the receipt of information from a user via one or more input devices, as well as provide information to the user via one or more output devices (e.g., display 130, audio system, etc.). For example, the I/O interface 125 can receive inputs from the user through a touch pad, keypad, buttons, touch screen, or other input device, and can likewise present one or more user interfaces on the display 130. One or more power supplies 140, which may include one or more of a battery or solar power cell, can be configured to supply electrical power to the various components of the pedometer 100.

It will be appreciated that the processing unit 110 may be implemented using one or more computer processors, microprocessors, and/or application specific integrated circuits (ASICs). Example processors can be those provided by Intel Corporation (Santa Clara, Calif.), AMD Corporation (Sunnyvale, Calif.), and Motorola Corporation (Schaumburg, Ill.). The processing unit 110 may comprise, or may be in communication with media, for example computer-readable media, which stores instructions that, when executed by the processor, cause the processing unit 110 to perform the processes described herein.

The example pedometer 100 shown in and described with respect to FIG. 1 is provided by way of example only. Numerous other operating environments, system architectures, and/or device configurations are possible in various embodiments of the invention. Other system embodiments can include fewer or greater numbers of components and may incorporate some or all of the functionality described with respect to the components shown in FIG. 1.

Operational Overview

Figure 2:
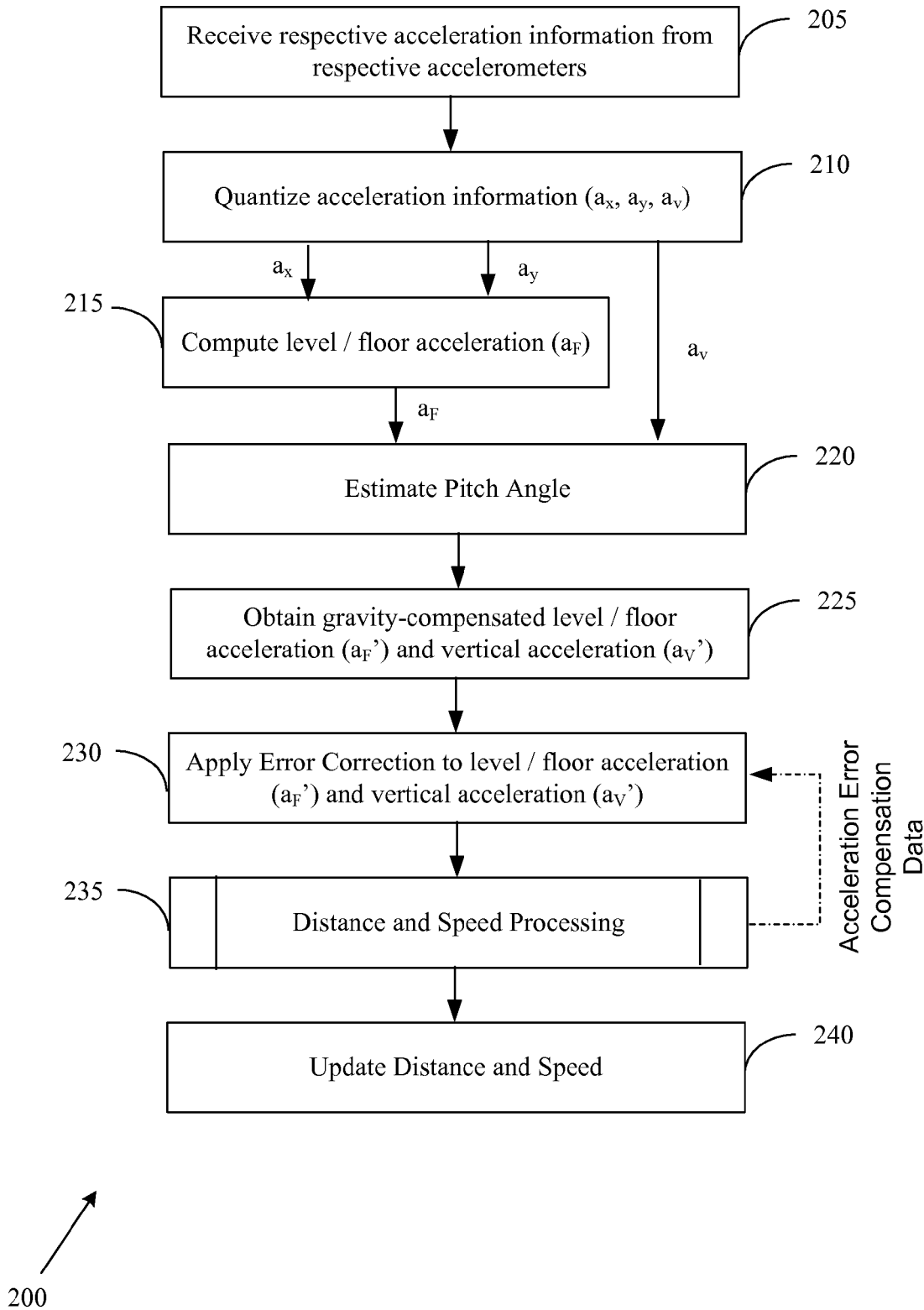
FIG. 2 illustrates an example flow diagram for an operation of an example pedometer in accordance with an example embodiment of the invention.

FIG. 2 illustrates a flow diagram 200 for an example operation of an example pedometer 100 in accordance with an example embodiment of the invention. During operation, the pedometer 100 can be positioned in one of a variety of locations associated with a user, such as affixed to a user's shoe or belt. The user may also initialize, configure, or instruct the pedometer 100 to record the distance traveled and/or speed by making the appropriate selections on the user interface of display 130 using, for example, buttons or a keypad provided by I/O interface 125.

Referring now to block 205, the processing unit 110 of the pedometer 100 may receive respective acceleration information from the accelerometers 105, 106, 107. In an example embodiment of the invention, the first accelerometer 105 can provide first acceleration information for an X axis or direction, the second accelerometer 106 can provide second acceleration information for a Y axis or direction, and the third accelerometer 107 can provide third acceleration information for a vertical (V) axis or direction.

At block 210, the processing unit 110 may utilize one or more quantization filters 132 to filter the received acceleration information. In general, the quantization filter 132 can be used to reduce quantization noise, or otherwise adjust, scale, or modify the acceleration information into a desired range for processing. For simplicity of reference, the filtered first acceleration information associated with the X axis or direction may be referred to as "$a_x$", the filtered second acceleration information associated with the Y axis or direction may be referred to as "$a_y$", and the filtered third acceleration information associated with the V axis or direction—or the vertical acceleration—may be referred to as "$a_y$". The filtered first acceleration information ($a_x$) and the filtered second acceleration information ($a_y$) can be available at block 215, while the vertical acceleration ($a_y$) can be available at block 220 and other blocks as needed.

At block 215, the processing unit, perhaps by executing instructions of the computation processing logic module 112, can compute the total floor/level acceleration ($a_F$). More specifically, the total floor/level acceleration ($a_F$) can be determined by combining the filtered first acceleration information ($a_x$) and the filtered second acceleration information ($a_y$), via the equation $a_F=\sqrt{a_x^2+a_y^2}$. Thus, the two accelerations ($a_x$, $a_y$) can be reduced to a single floor/level acceleration ($a_F$). Accordingly, following block 215, the original 3-dimensional accelerations ($a_x$, $a_y$, $a_v$) are reduced to 2-dimensional accelerations ($a_F$, $a_v$).

Figure 3:
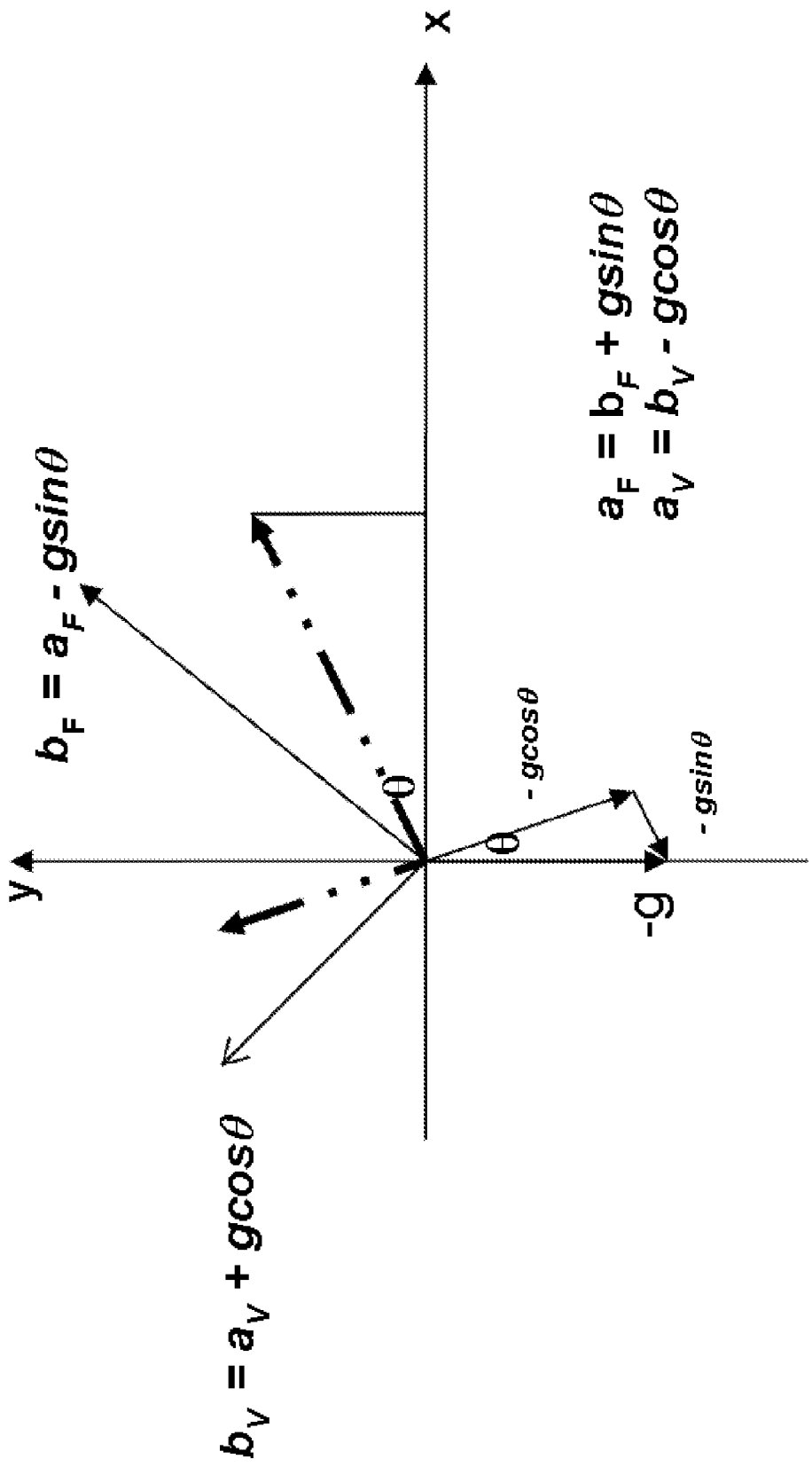
FIG. 3 illustrates an example chart for illustrating a pitch angle, according to an example embodiment of the invention.

At block 220, the processing unit 110, perhaps by executing instructions of the computation processing logic module 112, can estimate the pitch angle. The estimated pitch angle is calculated at block 220 for purposes of performing gravity compensation for the acceleration information at block 225. More specifically, the pitch angle can be computed or otherwise determined from the floor/level acceleration ($a_F$) and the vertical acceleration ($a_v$) from blocks 210, 215. In an example embodiment of the invention, the pitch angle θ for normal running and walking can be approximated by solving for θ in the following equation: $a_F \sin\theta - a_V \cos\theta - g = 0$, where g is the gravitational acceleration constant (e.g., approximately 9.81 m/s²). The foregoing equation may be derived from FIG. 3 that illustrates the following relationship between the pitch angle θ and the two accelerations—(i) the floor/level acceleration $a_F$ and (ii) the vertical acceleration $a_V$:

$$\tan\theta = \frac{\text{Vertical Acceleration}}{\text{Horizontal Acceleration}} = \frac{b_V}{b_F} = \frac{a_V + g\cos\theta}{a_F - g\sin\theta}.$$

$$\Rightarrow a_F\sin\theta - a_v\cos\theta - g = 0$$

Based upon the foregoing relationships, the pitch angle θ can be approximately determined as follows:

$$\theta = \sin^{-1}\left(\frac{-a_V g \pm \sqrt{a_V^2(a_F^2 + a_V^2 - g^2)}}{a_F^2 + a_V^2}\right).$$

It will be appreciated that only one pitch angle θ is obtained using two additional predetermined restrictions. A first restriction may require that the pitch angle θ be within −90 degrees and +90 degrees. The second restriction may require that the pitch angle θ be consistent with the floor and vertical accelerations, according to an example embodiment of the invention.

Following the estimation of the pitch angle θ, processing may proceed to block 225. At block 225, the processing unit 110, perhaps by executing the compensation/correction processing module 114, can use a gravity-compensation model to compensate for gravity in the floor/level acceleration ($a_F$) and the third acceleration information ($a_v$). In an example embodiment, the gravity-compensation model can remove an effect of gravity from the floor/level acceleration ($a_F$) and the vertical acceleration ($a_v$). The gravity compensation model can include the following: $a^{F\prime}:=a_F-g\cdot\sin\theta$ and $a_V':=a_V+g\cdot\cos\theta$, where $a_F'$ is the gravity-compensated floor/level acceleration, $a_v'$ is the gravity-compensated vertical acceleration, θ is the pitch angle, and $a_F$ and $a_v$ are the uncompensated accelerations.

Figure 4:
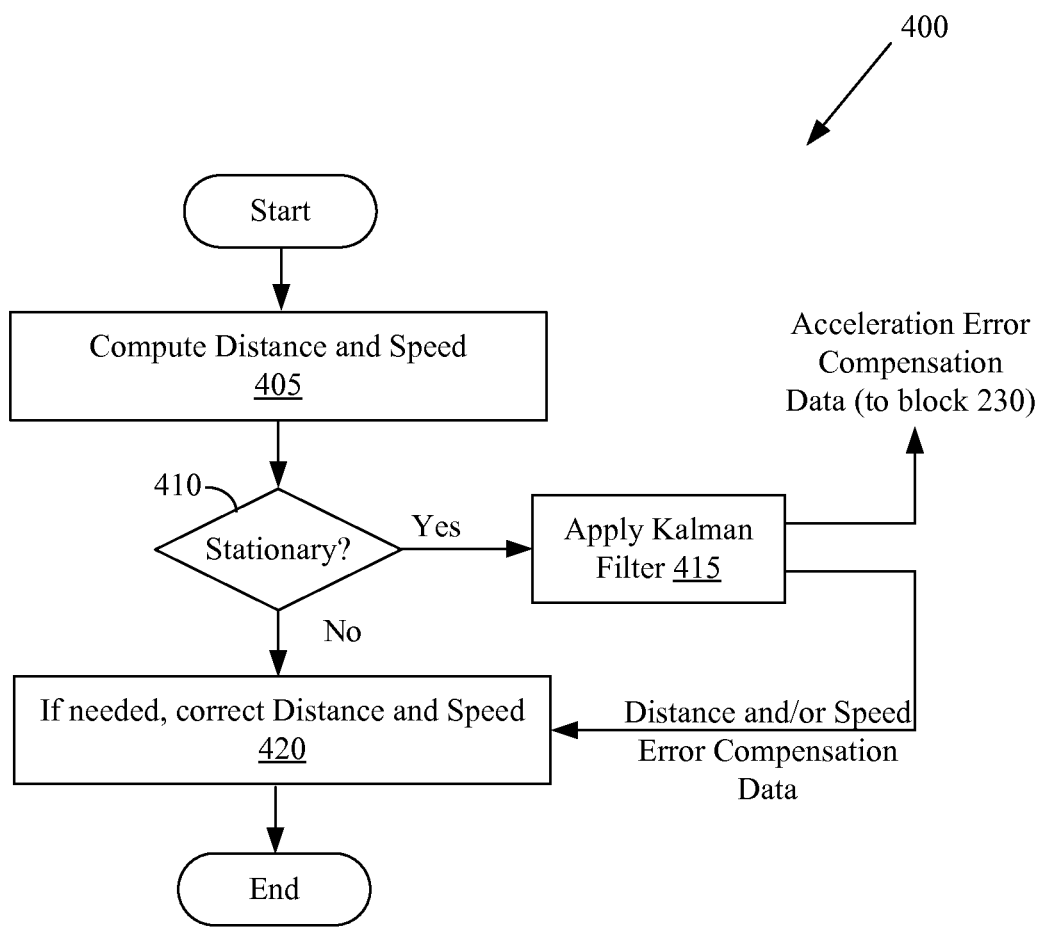
FIG. 4 illustrates an example flow diagram for computing stride distance and/or speed, according to an example embodiment of the invention.

Following block 225 is block 230, where a calibration/error correction process may be performed. At block 230, the processing unit 110, perhaps by executing instructions of the compensation/correction processing module 114, can further apply error correction to the gravity-compensated floor/level acceleration $a_F'$ to generate a calibrated floor/level acceleration $a_F''$. Likewise, block 230 can also apply error correction to the gravity-compensated vertical acceleration $a_v'$ to generate a calibrated vertical acceleration $a_v''$. It will be appreciated that the error correction in block 230 may be based upon calibrations needed to correct for variations in the design and/or operations of the accelerometers 105, 106, 107. In addition, at block 230, the pitch angle, $$\theta = \sin^{-1}\left(\frac{-a_V g \pm \sqrt{a_V^2(a_F^2 + a_V^2 - g^2)}}{a_F^2 + a_V^2}\right),$$

and the level and vertical accelerations $a_F$ and $a_V$ are calibrated using the acceleration error compensation data (received from the Kalman filter processing described with respect to block 235 of FIG. 2 and block 415 of FIG. 4). For example, the calibrated the floor/level acceleration $a_F''$ and the calibrated third acceleration information $a_v''$ can be generated as follows:

$$a_F''=a_F'+\delta a^F; \text{ and}$$

$$a_v''=a_v'+\delta a_V.$$

Following block 230, processing may proceed to block 235, where distance and speed processing may be performed. As described herein with respect to FIG. 4, an extended Kalman filter can be utilized at block 235 of FIG. 2 to determine acceleration, speed, and/or distance error correction values responsive to a zero-level-speed update (ZFUPT) and/or zero-vertical-speed update (ZVUPT). The speed, and/or distance error correction values can be utilized at block 235 to obtain corrected speed and/or distance for one or more intervals. The acceleration and/or error correction values can also be provided for use at block 230 to calibrate the accelerations prior to the distance and speed processing of block 235. At block 240, the computed speed and/or distance for one or more intervals can be combined with previously determined speed and/or distance values. For example, the speeds can be combined to determine an average floor/level speed and/or vertical speed for a period of time. Likewise, the distances can be added to determine a total floor/level distance and/or a total vertical distance for a period of time, according to an example embodiment of the invention. For example, a current total distance traveled can be determined by summing a prior total distance traveled and the computed/estimated distance traveled.

FIG. 4 illustrates an example flow diagram 400 for computing stride distance and/or speed, according to an example embodiment of the invention. The block diagram 400 may be utilized as an example implementation for the distance and speed processing of block 235 of FIG. 2, according to an example embodiment. However, it will be appreciated that many variations of FIG. 4 are available without departing from example embodiments of the invention.

At block 405, the traveled distance $D_i$ and speed $S_i$ may be computed using the following double integration formulas from the compensated and calibrated accelerations: $S_{j,i+1}=S_{j,i}+a_{j,i}\cdot\Delta t$ and $$D_{j,i+1} = D_{j,i} + a_{j,i}\cdot\Delta t + \frac{1}{2}a_{j,i}\cdot\Delta t^2,$$

where $\Delta t$ is the propagation interval time determined from time information from clock 120, j=F or V (to calculate $S_F$, $S_V$, $D_F$, $D_V$, respectively) where $a_{F,i}$ and $a_{V,i}$ are the calibrated level and vertical accelerations (e.g., from block 230), and i=0, 1, 2 . . . to represent the number of intervals contributing to the distance and speed computations.

Block 410 may determine whether a substantially stationary scenario is detected. In particular, block 410 may involve comparing one or more of the following components or functions of the following components: the floor or vertical accelerations $a_i$, speed $S_i$, and distance $D_i$, with respective predetermined floor or vertical acceleration, speed, and distance thresholds, etc., respectively, that may be indicative of a substantially stationary scenario. These predetermined thresholds may be obtained from statistical methods in order to balance accuracy with an acceptable number of false positives, according to an example embodiment of the invention. It will be appreciated that the floor or vertical accelerations used in the comparison of block 410 may be uncalibrated or pre-calibrated acceleration information (e.g., prior to block 230 in FIG. 2), according to an example embodiment of the invention. However, calibrated acceleration information (e.g., from error correction in block 230 in FIG. 2) can equally be utilized without departing from example embodiments of the invention.

If block 410 indicates the floor or vertical accelerations, speeds, and distances of the device are substantially zero, then processing proceeds to block 415. At block 415, the processing of a Kalman filter such as extended Kalman Filter (EKF) 135 of FIG. 1 can be used to determine acceleration, distance, and/or speed error compensation data, which may compensate for calibration errors attributable to one or more accelerometers or other pedometer components (e.g., quantization filter, processing delay, etc.). The Kalman filter can also provide angle calibration compensation via $$\theta = \sin^{-1}\left(\frac{-a_V g \pm \sqrt{a_V^2(a_F^2 + a_V^2 - g^2)}}{a_F^2 + a_V^2}\right).$$

Compensated accelerations $a_V''$ and $a_F''$ are compensated using accelerometer biases, $\delta a_F$ and $\delta a_V$, in this example embodiment, which can be extended to include compensation for scale-factor and misalignment errors, in the Kalman filter. In addition, the Kalman filter can provide distance and speed compensation data $\delta D_F$, $\delta D_V$, $\delta S_F$, and $\delta S_V$ to improve distance and speed estimation, according to an example embodiment of the invention. It will also be appreciated that the pedometer 100 may allow for the Kalman filter to be accessed manually to invoke calibration and determine compensation data according to an example embodiment of the invention.

Block 420 can be reached from block 415 or from block 410 (without update of block 415). If block 420 is reached directly from block 410, then the distance error compensation data $\delta D_F$, $\delta D_V$ values and the speed error compensation data $\delta S_F$, $\delta S_V$ values may be zero. On the other hand, if block 420 is reached from block 415, then the estimated distance and speed $D_F$, $D_V$, $\delta S_F$, and $\delta S_V$ determined at block 405 are updated with $\delta D_F$, $\delta D_V$, $\delta S_F$, and $\delta S_V$ values received from the EKF processing at block 415. As an example, the floor/level speed $S_F$, the vertical level speed $S_V$, the floor/level distance $D_F$, and the vertical distance $D_V$ can be compensated as follows:

Compensated floor/level Speed $S_{F\_COMP} = S_F + \delta S_F$;
Compensated vertical speed $S_{V\_COMP} = S_V + \delta S_V$;
Compensated floor/level distance $D_{F\_COMP} = D_F + \delta D_F$; and
Compensated vertical distance $D_{V\_COMP} = D_V + \delta D_V$.

The operations of an example extended Kalman filter that is operable with block 415 to determine the acceleration, distance, and/or speed error compensation data will now be described in further detail. According to an example embodiment of the invention, the extended Kalman filter can have a state estimate vector $\overline{X} = (D_F, D_V, S_F, S_V, a_F, a_V)^T$ where $(D_F, D_V)^T$ is the estimated floor and vertical distance vector, $(S_F, S_V)^T$ is the estimated floor and vertical speed vector, and $(a_F, a_V)^T$ is the estimated floor and vertical acceleration vector. The system model for the Kalman filter is $\overline{X} = f(\overline{X}(t), t) + \overline{w}(t)$ where $\overline{w}(t) \sim N(\overline{0}, Q(t))$ and $f(\overline{X}(t), t)$ are modeled as follows:

$$\begin{cases} \dot{D}_F = S_F \\ \dot{D}_V = S_V \\ \dot{S}_F = a_F \cdot \cos\theta + a_V \cdot \sin\theta \\ \dot{S}_V = a_F \cdot \sin\theta + a_V \cdot \cos\theta \\ \dot{a}_F = 0 \\ \dot{a}_V = 0 \end{cases}$$

where $\theta$ is the solution of $a_F \sin\theta - a_V \cos\theta - g = 0$

It will be appreciated that the process noise model $w(t)$ can be determined through real time data similar to thresholds, according to an example embodiment of the invention.

The corresponding error state vector may be defined as $\hat{X} = (\delta D_F, \delta D_V, \delta S_F, \delta S_V, \delta a_F, \delta a_V)^T$, where $(\delta D_F, \delta D_V)^T$ is the floor and down distance errors vector, $(\delta S_F, \delta S_V)^T$ is the floor and down speed errors vector, and $(\delta a_F, \delta a_V)^T$ is the floor and down acceleration error vector. $P(t) = E(\hat{X}\hat{X}^T)$ is the error covariance matrix of $\hat{X}$, according to an example embodiment of the invention.

The Error Covariance propagation equation is $\dot{P}(t) = F(\hat{X}(t), t) \cdot P(t) + P(t) \cdot F^T(\hat{X}(t), t) + Q(t)$, where $$F(\hat{X}(t), t) = \left.\frac{\partial f(\overline{X}(t), t)}{\partial \overline{X}(t)}\right|_{\overline{X}(t) = \hat{X}(t)} = \begin{pmatrix} 0 & 0 & 1 & 0 & 0 & 0 \\ 0 & 0 & 0 & 1 & 0 & 0 \\ 0 & 0 & 0 & 0 & \cos\theta & \sin\theta \\ 0 & 0 & 0 & 0 & -\sin\theta & \cos\theta \\ 0 & 0 & 0 & 0 & 0 & 0 \\ 0 & 0 & 0 & 0 & 0 & 0 \end{pmatrix}.$$

The state estimate update is $\hat{X}_k^+ = \hat{X}_k^- - K_k h_k(\hat{X}_k^-)$. The Error Covariance Update is $P_k^+ = [I - K_k H_k(\hat{X}_k^-)]P_k^-$. Where the measurement H matrix is $H_k(\hat{X}_k^-) = (0\ 0\ 1\ 0\ 0\ 0)$ for zero-level-speed updates (ZFUPTs), $H_k(\hat{X}_k^-) = (0\ 0\ 0\ 1\ 0\ 0)$ for zero-vertical-speed updates (ZVUPTs), and $$H_k(\hat{X}_k^-) = \begin{pmatrix} 0 & 0 & 1 & 0 & 0 & 0 \\ 0 & 0 & 0 & 1 & 0 & 0 \end{pmatrix}$$

for simultaneous ZFUPTs and ZVUPTs. The gain matrix is $K_k = P_k^- H_k^T(\hat{X}_k^-)[H_k(\hat{X}_k^-)P_k^- H_k^T(\hat{X}_k^-) + R_k]^{-1}$ where $R_k$ is the measurement noise matrix that corresponds to the measurement H matrix.

Various block and/or flow diagrams of systems, methods, apparatuses, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions or via implementation in ASICs. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, ASIC, or other programmable data processing apparatus to produce a particular machine, such that the instructions that execute on the computer, processor, ASIC, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems, or ASICs that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An advanced pedometer, comprising:
a first accelerometer for providing first acceleration information for a first direction;
a second accelerometer for providing second acceleration information for a second direction;
a third accelerometer for providing vertical acceleration information in a third direction, wherein the first, second, and third directions are independent of each other;
a clock for providing time information associated with the first acceleration information, the second acceleration information, and the third acceleration information; and
a processing module comprising one or more processors, wherein the processing module is configured to receive the first, second, and third acceleration information, and is further configured to execute computer-executable instructions to:
determine a floor level acceleration information for a plane by calculating an absolute magnitude of a combination of the first acceleration information and the second acceleration information, wherein the plane defines a horizontal plane defined by the first direction and the second direction and wherein the third direction is a vertical direction perpendicular to the horizontal plane; and
estimate a distance traveled based on the floor level acceleration information, the vertical acceleration information, and at least a portion of the time information, wherein the distance traveled is estimated independently of any direction information from any directional sensors.

2. The pedometer of claim 1, wherein the processing module is further configured to execute computer-executable instructions to:
estimate one or more errors in the floor level acceleration information and the vertical acceleration information, wherein the one or more errors are estimated responsive to a zero speed determination indicative of no movement,
wherein the estimated one or more errors are utilized to calibrate the floor level acceleration information and the vertical acceleration information to generate calibrated floor level acceleration information and calibrated vertical acceleration information, wherein the calibrated floor level acceleration information and the calibrated vertical acceleration information are utilized to estimate the distance traveled.

3. The pedometer of claim 2, further comprising:
an extended Kalman Filter (EKF), wherein the extended Kalman filter (EKF) having a plurality of error states receives the floor level acceleration information and the vertical acceleration information and estimates the one or more errors.

4. The pedometer of claim 3, wherein the plurality of error states of the extended Kalman filter (EKF) comprise one or more distance error states and one or more speed error states.

5. The pedometer of claim 2, wherein the zero speed determination is based upon the floor level acceleration information and the vertical acceleration information being within predefined threshold values.

6. The pedometer of claim 1, wherein the processing module is further configured to execute computer-executable instructions to:
determine a current total distance traveled by summing a prior total distance traveled and the estimated distance traveled.

7. The pedometer of claim 1, wherein the processing module is further configured to execute computer-executable instructions to:
compensate for an effect of gravity in the floor level acceleration information and the vertical acceleration information to generate gravity-compensated floor level acceleration information and gravity-compensated vertical acceleration information,
wherein the gravity-compensated floor level acceleration information and the gravity-compensated vertical acceleration information are utilized to estimate the distance traveled.

8. The pedometer of claim 1, wherein the processing module is further configured to execute computer-executable instructions to:
estimate a speed using the floor level acceleration information, the vertical acceleration information, and a time associated with the floor level acceleration information and the vertical acceleration information, wherein the estimated speed is utilized to estimate the distance traveled.

9. The pedometer of claim 1, wherein the floor level acceleration information for a plane is calculated as absolute magnitude of the combination of the first acceleration information and the second acceleration information using a formula $a_F = \sqrt{a_x^2 + a_y^2}$, where $a_F$ is the floor level acceleration information, $a_x$ is the first acceleration information and $a_y$ is the second acceleration information.

10. A method for an advanced pedometer, comprising:
receiving, from a first accelerometer, first acceleration information for a first direction;
receiving, from a second accelerometer, second acceleration information for a second direction;
receiving, from a third accelerometer, vertical acceleration information for a third direction, wherein the first, second, and third directions are independent of each other;
receiving, from a clock, time information associated with the first acceleration information, the second acceleration information, and the third acceleration information;
determining floor level acceleration information for a plane by calculating an absolute magnitude of a combination of the first acceleration information and the second acceleration information, wherein the plane defines a horizontal plane defined by the first direction and the second direction and wherein the third direction is a vertical direction perpendicular to the horizontal plane;
estimating a distance traveled based on the floor level acceleration information, the vertical acceleration information, and a time associated with the floor level acceleration information and the vertical acceleration information, wherein the distance traveled is estimated independently of any direction information from any directional sensors; and
wherein the above operations are performed by one or more processors or application specific integrated circuits (ASICs) associated with a processing module.

11. The method of claim 10, further comprising:
estimating one or more errors in the floor level acceleration information and the vertical acceleration information, wherein the one or more errors are estimated responsive to a zero speed determination indicative of no movement,
wherein the estimated one or more errors are utilized to calibrate the floor level acceleration information and the vertical acceleration information to generate calibrated floor level acceleration information and calibrated vertical acceleration information, wherein the calibrated floor level acceleration information and the calibrated vertical acceleration information are utilized to estimate the distance traveled,
wherein the above operation is performed by one or more processors or application specific integrated circuits (ASICs) associated with the processing module.

12. The method of claim 11, wherein an extended Kalman filter (EKF) having a plurality of error states receives the floor level acceleration information and the vertical acceleration information and is utilized to estimate the one or more errors.

13. The method of claim 12, wherein the plurality of error states of the extended Kalman filter (EKF) comprise one or more distance error states and one or more speed error states.

14. The method of claim 11, wherein the zero speed determination is based upon the floor level acceleration information and the vertical acceleration information being within predefined threshold values.

15. The method of claim 10, further comprising:
determining a current total distance traveled by summing a prior total distance traveled and the estimated distance traveled,
wherein the above operation is performed by one or more processors or application specific integrated circuits (ASICs) associated with the processing module.

16. The method of claim 10, further comprising:
compensating for an effect of gravity in the floor level acceleration information and the vertical acceleration information to generate gravity-compensated floor level acceleration information and gravity-compensated vertical acceleration information,
wherein the gravity-compensated floor level acceleration information and the gravity-compensated vertical acceleration information are utilized to estimate the distance traveled,
wherein the above operation is performed by one or more processors or application specific integrated circuits (ASICs) associated with the processing module.

17. The method of claim 10, further comprising:
estimating a speed using the floor level acceleration information, the vertical acceleration information, and a time associated with the floor level acceleration information and the vertical acceleration information,
wherein the estimated speed is utilized to estimate the distance traveled,
wherein the above operation is performed by one or more processors or application specific integrated circuits (ASICs) associated with the processing module.

18. The method of claim 10, wherein the floor level acceleration information for a plane is calculated as absolute magnitude of the combination of the first acceleration information and the second acceleration information using a formula $a_F = \sqrt{a_x^2 + a_y^2}$, where $a_F$ is the floor level acceleration information, $a_x$ is the first acceleration information and $a_y$ is the second acceleration information.

* * * * *